United States Patent
Tournatory (10) Patent No.: US 8,890,502 B2
(45) Date of Patent: Nov. 18, 2014

(54) LOW-NOISE, HIGH BANDWIDTH QUASI-RESONANT MODE SWITCHING POWER SUPPLY

(75) Inventor: David C. G. Tournatory, San Francisco, CA (US)

(73) Assignee: Quantance, Inc., San Mateo, CA (US)

( * ) Notice: Subject to any disclaimer, the term of this patent is extended or adjusted under 35 U.S.C. 154(b) by 365 days.

(21) Appl. No.: 13/385,405

(22) Filed: Feb. 17, 2012

(65) Prior Publication Data

US 2013/0214752 A1    Aug. 22, 2013

(51) Int. Cl.
G05F 1/00    (2006.01)

(52) U.S. Cl.
USPC ............................................ 323/285; 323/283

(58) Field of Classification Search
CPC ......... H02M 1/44; H02M 3/156; G05F 1/461; G05F 1/467
USPC ................. 323/268, 271, 282–288; 363/21.02
See application file for complete search history.

(56) References Cited

U.S. PATENT DOCUMENTS

| | | |
|---|---|---|
| 3,671,846 A | 6/1972 | Corey |
| 3,900,823 A | 8/1975 | Sokal et al. |
| 4,097,773 A | 6/1978 | Lindmark |
| 4,292,581 A | 9/1981 | Tan |
| 4,346,349 A | 8/1982 | Yokohama |
| 4,456,872 A | 6/1984 | Froeschle |
| 4,636,927 A | 1/1987 | Rhyne et al. |
| 4,686,448 A | 8/1987 | Jones et al. |
| 4,697,160 A | 9/1987 | Clark |
| 4,908,565 A | 3/1990 | Cook et al. |
| 5,200,709 A | 4/1993 | Saito et al. |
| 5,737,207 A | 4/1998 | Uratani et al. |
| 5,905,407 A | 5/1999 | Midya |
| 5,986,500 A | 11/1999 | Park et al. |
| 6,028,476 A | 2/2000 | Schweighofer |
| 6,084,468 A | 7/2000 | Sigmon et al. |

(Continued)

FOREIGN PATENT DOCUMENTS

| | | |
|---|---|---|
| GB | 2409115 A | 6/2005 |
| JP | 55-157356 | 5/1982 |

(Continued)

OTHER PUBLICATIONS

United States Office Action, U.S. Appl. No. 13/385,406, Mar. 19, 2013, 6 pages.

(Continued)

*Primary Examiner* — Matthew Nguyen
(74) *Attorney, Agent, or Firm* — Fenwick & West LLP (57) ABSTRACT

High bandwidth, low noise switching power supply operating in quasi-resonant mode for filtering switching harmonic noise, while providing a fast control bandwidth and power at high efficiency. The power supply has an LCL tank defining a resonance period $T_{tank}$, and a switching circuit regulation loop for turning on its switching circuit for on-time $t_{ON}$ commencing at a time based on a state of regulation of the power supply. A switching capacitor current sensor triggers the switching circuit to turn off at the end of the resonance period $T_{tank}$, whereupon the switching and output inductors enter a discharging phase for a period not related to resonance period $T_{tank}$. "Quasi-resonant" operation, where the power supply is in resonant mode during on time $t_{ON}$ and not in resonant mode during off time $t_{OFF}$ ensures that the output inductor filters the switching harmonic noise of the switching circuit.

20 Claims, 7 Drawing Sheets

(56) References Cited

U.S. PATENT DOCUMENTS

| | | | |
|---|---|---|---|
| 6,097,614 A | 8/2000 | Jain et al. | |
| 6,130,525 A | 10/2000 | Jung et al. | |
| 6,175,273 B1 | 1/2001 | Sigmon et al. | |
| 6,191,653 B1 | 2/2001 | Camp, Jr. et al. | |
| 6,292,677 B1 | 9/2001 | Hagen | |
| 6,300,826 B1 | 10/2001 | Mathe et al. | |
| 6,518,856 B1 | 2/2003 | Casale et al. | |
| 6,529,073 B1 * | 3/2003 | Highfill et al. | 330/207 P |
| 6,552,606 B1 | 4/2003 | Veltman et al. | |
| 6,580,258 B2 | 6/2003 | Wilcox et al. | |
| 6,594,163 B2 | 7/2003 | Tsai | |
| 6,597,242 B2 | 7/2003 | Petz et al. | |
| 6,639,816 B2 | 10/2003 | Liu | |
| 6,646,507 B1 | 11/2003 | Prokin et al. | |
| 6,654,261 B2 | 11/2003 | Welches et al. | |
| 6,661,210 B2 | 12/2003 | Kimball et al. | |
| 6,684,969 B1 | 2/2004 | Flowers et al. | |
| 6,711,034 B2 | 3/2004 | Duerbaum et al. | |
| 6,724,248 B2 | 4/2004 | Llewellyn | |
| 6,763,049 B1 * | 7/2004 | Bees | 372/58 |
| 6,774,719 B1 | 8/2004 | Wessel et al. | |
| 6,792,252 B2 | 9/2004 | Kimball et al. | |
| 6,825,726 B2 | 11/2004 | French et al. | |
| 6,984,969 B1 | 1/2006 | Liu et al. | |
| 7,058,373 B2 | 6/2006 | Grigore | |
| 7,113,038 B2 | 9/2006 | Putzeys | |
| 7,183,856 B2 | 2/2007 | Miki et al. | |
| 7,197,086 B2 | 3/2007 | Rauh et al. | |
| 7,454,238 B2 | 11/2008 | Vinayak et al. | |
| 7,547,995 B1 | 6/2009 | Andrews et al. | |
| 7,564,702 B2 | 7/2009 | Schlecht | |
| 7,583,065 B2 | 9/2009 | Xu et al. | |
| 7,583,149 B2 | 9/2009 | Funaki et al. | |
| 7,602,167 B2 | 10/2009 | Trafton et al. | |
| 7,671,699 B2 | 3/2010 | Wren | |
| 7,755,431 B2 | 7/2010 | Sun | |
| 7,764,054 B1 | 7/2010 | Guo et al. | |
| 7,859,336 B2 | 12/2010 | Markowski et al. | |
| 7,893,674 B2 | 2/2011 | Mok et al. | |
| 7,907,010 B2 | 3/2011 | Wendt et al. | |
| 7,907,014 B2 | 3/2011 | Nguyen et al. | |
| 7,921,309 B1 | 4/2011 | Isbister et al. | |
| 7,977,926 B2 | 7/2011 | Williams | |
| 8,008,902 B2 | 8/2011 | Melanson et al. | |
| 8,035,362 B2 | 10/2011 | Blanken | |
| 8,190,926 B2 | 5/2012 | Vinayak et al. | |
| 8,405,456 B2 | 3/2013 | Drogi et al. | |
| 8,553,434 B2 * | 10/2013 | Coccia et al. | 363/40 |
| 2003/0158478 A1 | 8/2003 | Petersen et al. | |
| 2004/0203982 A1 | 10/2004 | Barak et al. | |
| 2004/0263254 A1 | 12/2004 | Tahara et al. | |
| 2005/0064830 A1 | 3/2005 | Grigore | |
| 2006/0018136 A1 | 1/2006 | Takahashi | |
| 2007/0210771 A1 | 9/2007 | Wilson et al. | |
| 2008/0252380 A1 | 10/2008 | Blanken | |
| 2009/0044031 A1 | 2/2009 | Vinayak et al. | |
| 2009/0179698 A1 | 7/2009 | Ichitsubo et al. | |
| 2009/0184764 A1 | 7/2009 | Markowski et al. | |
| 2010/0250993 A1 | 9/2010 | Drogi et al. | |
| 2012/0194274 A1 | 8/2012 | Fowers et al. | |

FOREIGN PATENT DOCUMENTS

| | | |
|---|---|---|
| JP | 60-052607 | 11/1985 |
| JP | 01-137710 A | 5/1989 |
| JP | 04-129309 A | 4/1992 |
| JP | 2001-519612 | 10/2001 |
| JP | 2008-511065 A | 4/2006 |
| JP | 2008-537249 A | 9/2006 |
| WO | WO 99/18663 | 4/1999 |
| WO | WO 2004/112236 A1 | 12/2004 |
| WO | WO 2005/027297 A2 | 3/2005 |
| WO | WO 2005/041404 A1 | 5/2005 |
| WO | WO 2006/021790 A1 | 3/2006 |
| WO | WO 2006/111891 A1 | 10/2006 |

OTHER PUBLICATIONS

"BJT Differential Amplifier," eCircuit Center, 2004, pp. 1-5, [Online] [Retrieved on Mar. 21, 2013], Retrieved from the Internet<URL:http://www.ecircuitcenter.com/Circuits/BJT_Diffamp1.htm.

PCT International Search Report and Written Opinion, PCT Application No. PCT/US2013/024799, Apr. 22, 2013, 14 pages.

United States Office Action, U.S. Appl. No. 13/777,516, Apr. 24, 2013, 6 pages.

Chinese Office Action, Chinese Application No. 200780040407.5, Dec. 16, 2011, 7 pages.

European Examination Report, European Application No. 07813597.7, Nov. 10, 2011, 5 pages.

European Extended Search Report, European Application No. 07813597.7, Jul. 5, 2010, 12 pages.

International Search Report and Written Opinion, PCT/US07/74869, Jul. 29, 2008, 6 pages.

International Search Report and Written Opinion, PCT Application No. PCT/US10/29256, Jun. 1, 2010, 12 pages.

Japanese Office Action, Japanese Patent Application No. 2009-534729, Mar. 19, 2012, 4 pages.

Japanese Office Action, Japanese Application No. 2009-534729, Sep. 16, 2011, 7 pages.

Korean Office Action, Korean Patent Application No. 10-2009-7009869, Dec. 6, 2010, 6 pages.

Third Party Submissions, European Patent Application No. 07813597.7, Apr. 21, 2010, 5 pages.

United States Office Action, U.S. Appl. No. 12/249,717, Feb. 15, 2011, 7 pages.

United States Office Action, U.S. Appl. No. 12/249,717, Nov. 29, 2011, 13 pages.

United States Office Action, U.S. Appl. No. 12/749,260, Jul. 11, 2012, 6 pages.

United States Patent Application, U.S. Appl. No. 13/385,406, filed Feb. 17, 2012, Inventor David C.G. Tournatory et al., [Copy Not Enclosed].

Anderson, D.R. et al., "High-Efficiency High-Level Modulator for Use in Dynamic Envelope Tracking CDMA RF Power Amplifier," 2001, pp. 1509-1512, IEEE MTT-S Digest.

Araujo Samuel V., et al., "LCL Filter design for grid-connected NPC inverters . . . ", The 7th Intl. Conf. on Power Electronics, Oct. 22-26, 2007, p. 1133-1138, EXCO, Daegu, Korea.

Dadafshar Majid, "Drive RF Power Amplifiers with a High-Frequency Switching Regulator", EDN, Oct. 7, 2010, p. 22-27.

Dierburger, K. et al., "Simple and Inexpensive High-Efficiency Power Amplifier Using New APT MOSFETs," Nov. 1994, 14 pages, RF Expo East.

Erickson Bob, "Resonant Power Conversion", Fundamentals of Power Electronics, Chapter 19, 1997, Colorado Power Electronics Center, University of Colorado, Boulder.

Erickson Bob, "Quasi-Resonant Converters", Fundamentals of Power Electronics, Chapter 20, 1997, Colorado Power Electronics Center, University of Colorado, Boulder.

Hamill David C., et al., "A 'Zero' Ripple Technique Applicable to any DC Converter", PESC, IEEE, 1999, p. 1165-1171, vol. 2.

Li, Yushan, et al., "High Efficiency Wide Bandwidth Power Supplies for GSM and EDGE RF Power Amplifiers", ISCAS, 2005, p. 1314-1317, vol. 2.

Patterson Oliver D., et al., "Pseudo-Resonant Full Bridge DC/DC Converter", IEEE Transactions on Power Electronics, Oct. 1991, p. 671-678, vol. 6, No. 4.

Phinney Joshua, et al., "Filters with Active Tuning for Power Applications", IEEE Transactions on Power Electronics, Mar. 2003, p. 636-647, vol. 18, No. 2.

(56) References Cited

OTHER PUBLICATIONS

Raab Frederick H., Split-Band Modulator for Kahn-Technique Transmitters, IEEE MTT-S Digest, 2004, p. 887-890, vol. 2.

Raoufi Mustapha, et al., "Average Current Mode Control of a Voltage Source Inverter Connected to the Grid: . . . ", J. of Electrical Eng., 2004, p. 77-82, vol. 55, No. 3-4.

Wang Feipeng, et al., "An Improved Power-Added Efficiency 19-dBm Hybrid Envelope . . . ", IEEE Trans. on Microwave Theory and Techniques, Dec. 2006, p. 4086-4099, vol. 54, No. 12.

Williams Jim, "A Monolithic Switching Regulator with 100 μV Output Noise", Linear Technology, Application Note 70, Oct. 1997.

United States Office Action, U.S. Appl. No. 14/098,248, Mar. 4, 2014, 7 pages.

* cited by examiner

LOW-NOISE, HIGH BANDWIDTH QUASI-RESONANT MODE SWITCHING POWER SUPPLY

RELATED APPLICATIONS

This application is related to U.S. application entitled "Dynamic Power Supply Employing a Linear Driver and a Switching Regulator" filed on the same date.

FIELD OF THE INVENTION

This invention relates generally to power supplies deploying switching regulators with high bandwidth and low noise, and more particularly to switching power supplies that filter switching harmonic noise.

BACKGROUND ART

Many electronic devices tend to require a highly responsive, low noise, high efficiency switching regulator.

Switching regulators emit output current ripple at their switching frequency. That current is converted to switching voltage noise when driving a resistive load. This type of noise can be disruptive to systems that amplify low level signals, for example, where the switching noise can couple into the circuitry and become amplified along with the desired signal. Harmonics of the switching frequency, in particular can generate noise into radio bands and produce spurious transmissions or desensitize receivers.

One option is to add filtering at the output of the switching regulator. Common L-C low-pass filters can be used. Unfortunately, filtering also limits the responsiveness of the switching regulator to abrupt changes in load, line, or voltage setting. Since the filters exhibit delay, it is generally not possible to include these filters inside the switching regulator's control loop for stability reasons. Thus, low noise and responsiveness are frequently tradeoffs against one another.

The switching frequency of the switching regulator could be increased, allowing a higher cutoff frequency filter. However, higher switching frequencies result in higher magnetics losses and higher switching losses, decreasing power conversion efficiency.

Therefore, there remains a need for a power supply that remains responsive, low noise, and maintains high efficiency.

SUMMARY OF THE INVENTION

The objects and advantages of the invention are secured by a switching power supply that operates in a quasi-resonant mode and incorporates substantial output filtering for low switching harmonic noise, while providing a fast control bandwidth and power at high efficiency. More precisely, the low-noise, high bandwidth switching power supply is designed to operate in the quasi-resonant mode for filtering switching harmonic noise produced by a switching circuit. The switching power supply has an LCL (inductor-capacitor-inductor) tank made up of a switching inductor, a switching capacitor and an output inductor. These three elements determine a resonance period $T_{tank}$ in accordance with the rules of LC-circuits. Further, the switching circuit has a control input and a switching output that is connected in series with the switching inductor.

The switching power supply has a switching circuit regulation loop for turning on the switching circuit for a certain on-time $t_{ON}$. The on-time $t_{ON}$ starts at a time that is based on a state of regulation of the switching power supply.

Once on, the switching power supply uses a switching capacitor current sensor for triggering the switching circuit to turn off at the end of the resonance period $T_{tank}$. This means that the on-time $t_{ON}$ is substantially equal to the resonance period $T_r$. Specifically, the switching capacitor current sensor triggers when the switching capacitor current reaches zero after a full resonance period $T_{tank}$. Then, during an off time $t_{OFF}$, the switching inductor and the output inductor enter a discharging phase for a period not related to resonance period $T_{tank}$. Rather, the discharging phase lasts for a period defined by off time $t_{OFF}$ that ends with the re-initiation of the on-period or on time $t_{ON}$. The re-initiation of the on-period is based on a state of regulation of the switching power supply as just described. Thus, a "quasi-resonant" mode of operation is enabled where the switching power supply is in resonant mode during on time $t_{ON}$ and not in resonant mode during discharging phase lasting for the duration of off time $t_{OFF}$.

The output inductor provides filtering of the switching harmonic noise or ripple generated by the switching circuit. It should be noted that the termination of the on-off switching cycle according to the invention does not necessarily take place at either "zero current" or "zero voltage" across the switching circuit.

Preferably, the switching power supply uses a pair of complementary switches in its switching circuit for switching between the on-period (for on-time $t_{ON}$) and off-period (for off-time $t_{OFF}$). In fact, this pair constitutes the "switch" of the switching circuit.

The monitoring of the state of regulation of the switching power supply can be implemented in different ways. For example, the state of regulation can be determined from a certain current level of a switching inductor current. In this case, a comparator is provided for comparing the switching inductor current with a set current $i_{SET}$ that corresponds to the predetermined level at which the switching circuit is to be turned on.

In another embodiment, the state of regulation of the switching power supply is determined from an output voltage of the switching power supply. Here, an output voltage sensor is provided in the switching circuit regulation loop for monitoring the output voltage of the switching power supply.

In some embodiments the switching power supply is further connected with a linear driver by a combining network. Such network has a node for summing an output of the linear driver with an output of the switching power supply. When the switching power supply operates in a current mode the outputs are currents. On the other hand, when switching power supply operates in a voltage mode, the outputs are voltages.

The combining network has a driver feedback loop for the linear driver. In the preferred embodiment, the driver feedback loop has a capacitor coupled in series with the linear driver's output. As a result, the capacitor voltage $V_C$ corresponds to an integral of the current components contained in the driver's output and may be used in the combining network for improving feedback control of the switching power supply.

The invention further extends to a method for filtering switching harmonic noise in the switching power supply operating in quasi-resonant mode. The method calls for providing the LCL tank whose resonance period $T_{tank}$ is determined by the switching inductor, switching capacitor and output inductor. The switching output of the switching circuit is connected in series with the switching inductor of the LCL tank. Furthermore, the switching circuit regulation loop is provided for turning on the switching circuit for on-time $t_{ON}$, starting at the time determined by the state of regulation of the power supply, for example, when the switching inductor current reaches a certain level or when the output voltage of the switching power supply reaches a certain value. The end of the resonance period $T_{tank}$ is determined from the switching capacitor current by using a switching capacitor current sensor. In fact, the end of resonance period $T_{tank}$ coincides with zero switching capacitor current.

The continued discharge of the output inductor during the off-time $t_{OFF}$ in quasi-resonant mode results in the desired filtering of the switching harmonic noise. It should be noted that the method can be implemented in a current mode or in a voltage mode, depending on desired application of the switching power supply and type of load.

Furthermore, the method can be combined with methods deploying a linear driver and combining the outputs of the linear driver and the switching power supply.

Clearly, the apparatus and method of invention find many advantageous embodiments. The details of the invention, including its preferred embodiments, are presented in the below detailed description with reference to the appended drawing figures.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
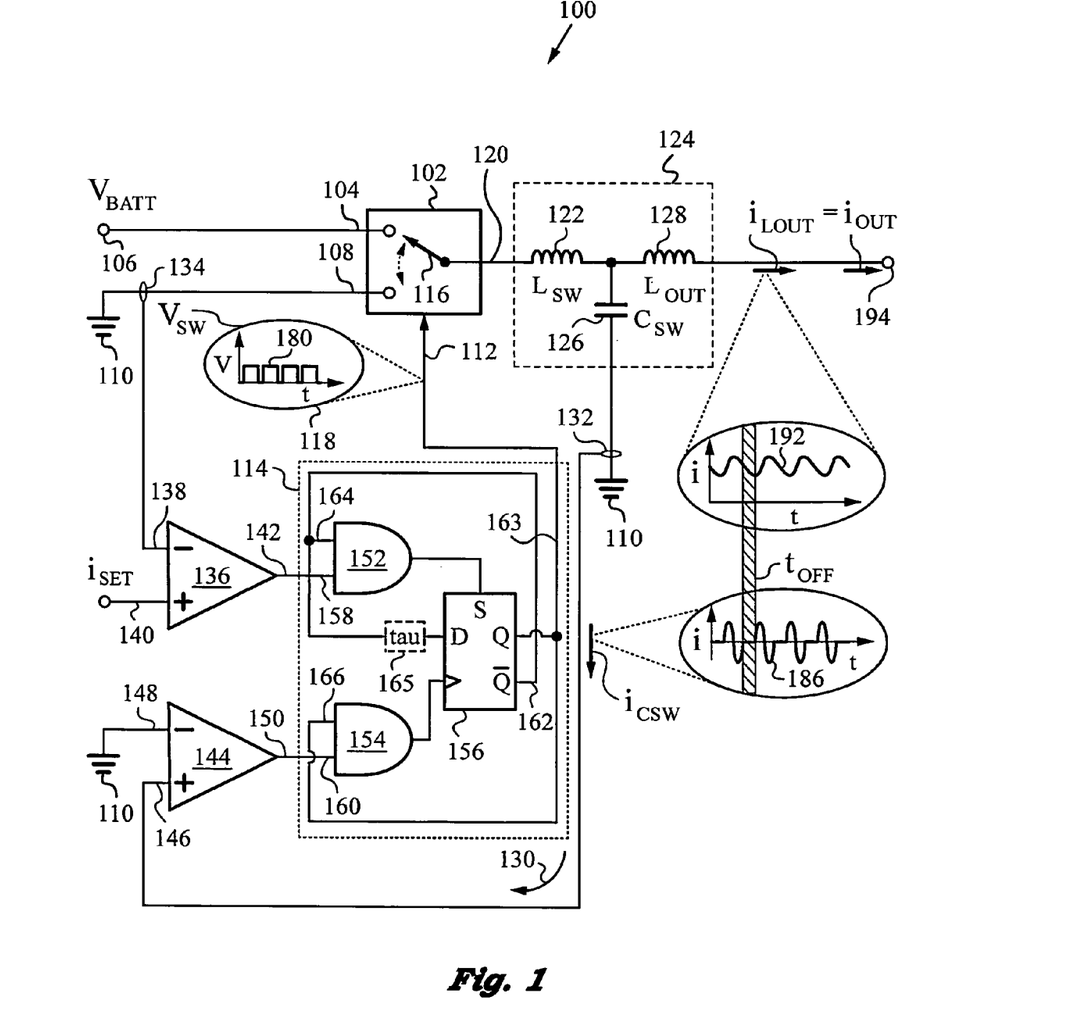
FIG. 1 is a diagram of a switching power supply according to the invention.

The present invention will be best understood by first reviewing a diagram of a switching power supply 100 as shown in FIG. 1. Switching power supply 100 has a switching circuit 102 connected at its first input 104 to a voltage source 106. In the present case, voltage source 106 is a battery providing a battery voltage $V_{BATT}$. Furthermore, in the specific example used herein, $V_{BATT}$=3.4 V. A second input 108 of switching circuit 102 is connected to ground 110. A control input 112 of switching circuit 102 is connected to a regulation circuit 114.

Switching circuit 102 has a switch 116, presented schematically in this figure and shown in detail below (see FIG. 2). Switch 116 switches between $V_{BATT}$ and ground 110 in response to a control signal 118 applied at control input 112 of switching circuit 102 by regulation circuit 114. Switch 116 is connected to a switching output 120 of switching circuit 102. Switching output 120 is connected in series with a switching inductor 122 having an inductance $L_{SW}$. In the present example, $L_{SW}$=2.2 µH.

Switching power supply 100 has an LCL (inductor-capacitor-inductor) tank 124. LCL tank 124 is made up of switching inductor 122, a switching capacitor 126 having a capacitance $C_{SW}$ and an output inductor 128 having an inductance $L_{OUT}$. In this example, $C_{SW}$=4.7 nF and $L_{OUT}$=4.7 µH. These three elements, namely switching inductor 122, switching capacitor 126 and output inductor 128 determine a resonance period $T_{tank}$ of LCL tank 124 in accordance with the rules of LC-circuits.

In particular, the resonance of LCL tank 124 has a resonance period $T_{tank}$ described by the following equation:

$$T_{tank}=2\pi\sqrt{L_{eq}C_{SW}}, \quad (Eq. 1)$$

where $L_{eq}$ is the parallel equivalent inductance of both inductors 122, 128. The equivalent inductance $L_{eq}$ is given by:

$$L_{eq} = \frac{L_{SW}L_{OUT}}{L_{SW} + L_{OUT}}, \quad (Eq. 2)$$

and is equal to approximately 1.5 µH in the present example. Thus, given the exemplary inductance and capacitance values, $T_{tank}$=527 ns. Switching power supply 100 has a switching circuit regulation loop 130. Regulation loop 130 has a capacitor current sensor 132 and also includes regulation circuit 114. Capacitor current sensor 132 is designed to monitor a switching capacitor current $i_{CSW}$.

Regulation loop 130 is designed to turn switching circuit 102 on for an on-time $t_{ON}$ that substantially corresponds in duration to one resonance period $T_{tank}$. The initiation of on-time $t_{ON}$ is set based on a state of regulation of switching power supply 100. In the preset embodiment, the state of regulation corresponds to a current level in switching inductor 122.

An inductor current sensor 134 is provided in switching circuit regulation loop 130. Sensor 134 measures the current in switching inductor 122 to ascertain the state of regulation of switching power supply 100 when switch 116 is connected to ground 110 during an off-time $t_{OFF}$. In other words, sensor 134 measures switching inductor current $i_{LSW}$ (see waveform 190 in FIG. 3) when switching circuit 102 is off. It should be noted that inductor current sensor 134 could be located at any suitable position in which it could reliably measure switching inductor current $i_{LSW}$, e.g., it could also be located at switching output 120 or at the other side of switching inductor 122 from switching output 120.

Switching power supply 100 has an error comparator 136 in its regulation loop 130. Comparator 136 is connected with its inverting input 138 to sensor 134. A non-inverting input 140 of comparator 136 is connected to a source (not shown)

that provides a set current $i_{SET}$ to which switching inductor current $i_{LSW}$ is compared to determine the state of regulation of switching power supply 100. An output 142 of comparator 136 is connected to regulation circuit 114, which is also a part of regulation loop 130. Note that output 142 will turn on when switching inductor current $i_{LSW}$ drops below set current $i_{SET}$.

In practice, current sensor 134 may convert the sensed current to a voltage, utilizing a simple current-sense amplifier well known in the art. In other words, $i_{SET}$ may be expressed by a voltage representative of the set current, and comparator 136 is then a simple voltage comparator.

Meanwhile, switching capacitor current sensor 132 is connected to another comparator 144 at its non-inverting input 146. Comparator 144 is a zero-crossing comparator. Hence, its second input, namely inverting input 148, is simply connected to ground 110. An output 150 of comparator 144 is connected to regulation circuit 114. Current sensor 132 and comparator 144 may operate in a fashion similar to current sensor 134 and comparator 136, namely by comparing voltage values representative of the current to be measured.

Regulation circuit 114 has AND gates 152, 154 as well as a D flip-flop 156. Inputs 158, 160 of gates 152, 154 are connected to comparators 136, 144, respectively. A Q output 163 of D flip-flop 156 is connected to control input 112 of switching circuit 102 for providing control signal 118 to turn switch 116 on and off. A high level at control input 112 turns switch 116 on by connecting $V_{BATT}$ at first input 104 to switching output 120. In contrast, a low level at control input 112 turns switch 116 off by connecting switching output 120 to ground 110 via second input 108.

Figure 2:
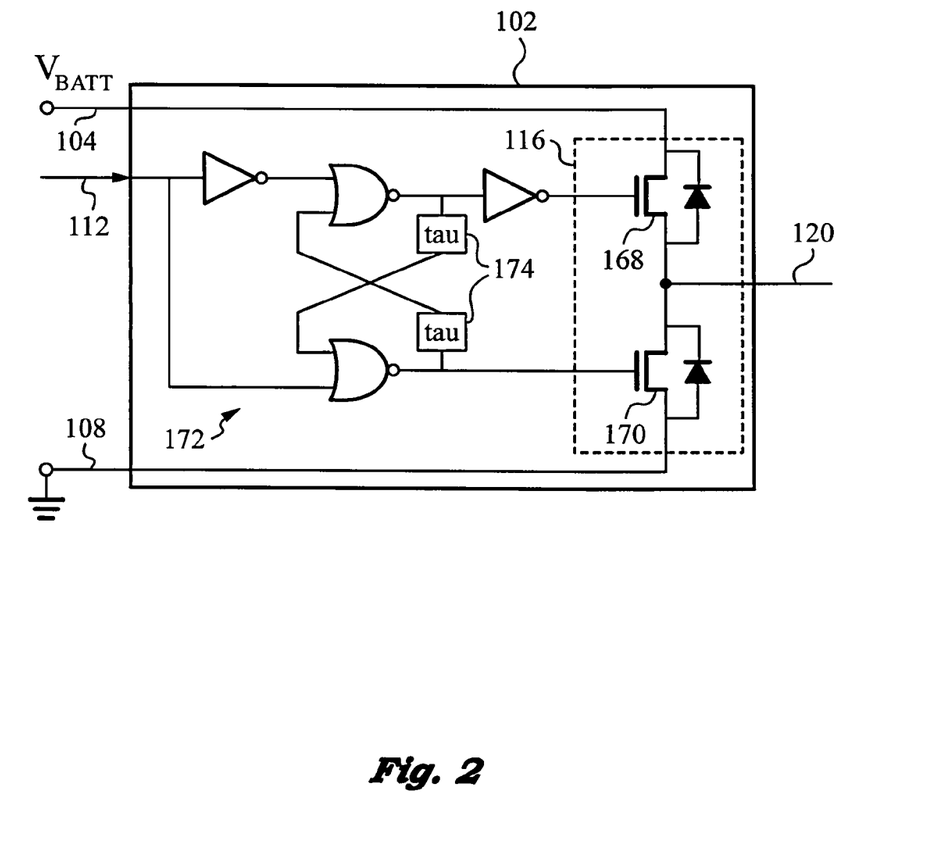
FIG. 2 is a detailed diagram of the switching circuit belonging to the switching power supply of FIG. 1.

We now refer to FIG. 2 to review in more detail switching circuit 102 belonging to switching power supply 100 illustrated in FIG. 1. Switching power supply 100 uses a pair of complementary switches, namely a P-channel metal-oxide-semiconductor field-effect transistor (MOSFET) 168 and an N-channel MOSFET 170 in switching circuit 102 to serve as switch 116. In this arrangement, during on-time $t_{ON}$, or in the on-state, transistor 168 conducts from first input 104 at voltage $V_{BATT}$ to switching output 120. During on-time $t_{ON}$, transistor 170 is turned off. On the other hand, in the off-state or during off-time $t_{OFF}$, it is transistor 170 that conducts from second input 108 at ground (zero voltage) to switching output 120. Transistor 168 is turned off during off-time $t_{OFF}$.

The on-off switching of switch 116 between transistors 168, 170 is controlled by control signal 118 (see FIG. 1) arriving at control input 112. A set of gates 172 and time delay elements 174 ensure a robust, non-overlapping operation of switch 116. Thus, only one of transistors 168, 170 or complementary switches is on at a time while the other is off safely before turning its complement on.

Returning to FIG. 1, we note that output of switching power supply 100 is delivered to an output 194. Output 194 is in series with output inductor 128. Thus, output inductor current $i_{LOUT}$ corresponds to output current $i_{OUT}$ of power supply 100 in the present embodiment ($i_{LOUT}=i_{OUT}$). A useful load, not shown, can be connected to output 194 to take advantage of power supply 100.

The operation of switching power supply 100 will now be explained by making additional reference to FIG. 3. The latter shows plots of relevant current and voltage waveforms, when operating in a quasi-resonant mode.

According to the invention, switching circuit regulation loop 130 turns on switching circuit 102 based on the state of regulation of switching power supply 100. In the present case, this occurs when a certain current level equal to $i_{SET}$ is reached in switching inductor 122 by switching inductor current $i_{LSW}$. More precisely, prior to turning switching circuit 102 on, current sensor 134 is measuring switching inductor current $i_{LSW}$ and comparing it with $i_{SET}$ with the aid of error comparator 136. Once switching inductor current $i_{LSW}$ drops below $i_{SET}$, output 142 of comparator 136 changes from low to high output level and communicates its high state to regulation circuit 114.

Regulation circuit 114 works in the following way. Input 164 of AND gate 152 is connected to the $\overline{Q}$ output 162 of D flip-flop 156. Input 166 of AND gate 154 is connected to the Q output 163 of D flip-flop 156. The Q output 163 also connects to control input 112 of switching circuit 102 and thus provides control signal 118.

When D flip-flop 156 is in the high state then Q output 163 is high. This means that control signal 118 is high, and thus control input 112 commands switch 116 to be "on". In this state, switch 116 connects $V_{BATT}$ provided by voltage source 106 to switching output 120 via P-channel MOSFET 168, and N-channel MOSFET 170 is turned off (see FIG. 2). Thus, the on-period or on-time $t_{ON}$ begins.

During this on-period, regulation circuit 114 passes the output of comparator 144 to AND gate 154 via input 160. At the same time, input 166 of AND gate 154 is already high, since it is connected to the Q output 163 of D flip-flop 156. Now, comparator 144 is configured to detect a zero crossing of switching capacitor current $i_{CSW}$, which indicates the end of a resonant period $T_{tank}$ and hence the end of on-time $t_{ON}$. While waiting for the zero crossing, the output of comparator 136 through AND gate 152 is blocked.

Thus, during the "on" period, or during on time $t_{ON}$, a positive-going current zero crossing detected at comparator 144 sends a high level to input 160 of AND gate 154. As input 166 of AND gate 154 is also high, the high level is passed through to the CLK input (indicated symbolically by ">" in FIG. 1) of D flip-flop 156. Since the $\overline{Q}$ output 162 is connected to the D input of D flip-flop 156, a positive-edge CLK signal inverts the state of flip-flop 156, and thus its output 162 goes low, resulting in control signal 118 going low and turning switch 116 off.

Now switching power supply 100 is in the "off" period, D flip-flop 156 is in the low state and the Q output 163 is low, and control input 112 keeps switch 116 off. In this state, switch 116 connects switching output 120 to ground via N-channel MOSFET 170, and P-channel MOSFET transistor 168 is turned off. Thus, the off-period or off-time $t_{OFF}$ begins.

Since input 164 of AND gate 152 is connected to the $\overline{Q}$ output 162 of D flip-flop 156, while input 166 of AND gate 154 is connected to the Q output 163, regulation circuit 114 passes the output of comparator 136 through AND gate 152 for detecting when the level of current in switching inductor 122 drops below $i_{SET}$. This occurs while the output of comparator 144 through AND gate 154 is blocked, since input 166 is low at this time and thus the output of AND gate 154 must stay low irrespective of the level of output 150 of comparator 144. Therefore, during the "off" period, or during off time $t_{OFF}$, a high level from comparator 136 indicating $i_{LSW}$ has dropped below $i_{SET}$ gets passed through to the S (set) input of D flip-flip 156. This sets the state of flip-flop 156 to high, and the Q output 163 goes high, turning switch 116 on, thus initiating another on-period.

A delay 165 may be included in regulation circuit 114 to ensure that a positive-going current zero crossing detected at comparator 144 at the initiation or beginning of the "on" period does not prematurely trigger the "off" state. Instead, a high level from AND gate 154 applied to CLK input before the end of the delay time introduced by delay 165 results in no action by D flip-flop 156. As a result, the on-period is not disrupted at its onset.

Figure 3:
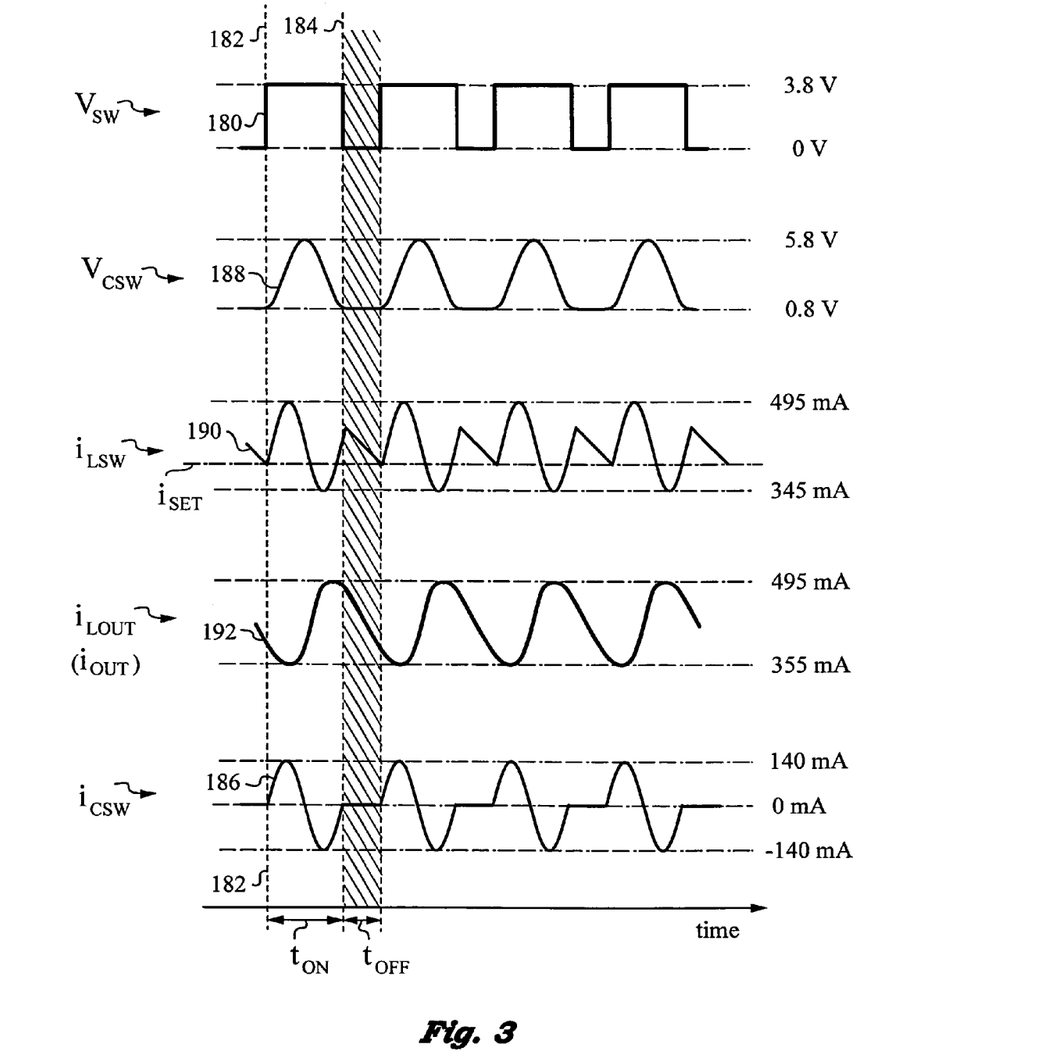
FIG. 3 are plots of relevant current and voltage waveforms in the switching power supply of FIG. 1, when operating in a quasi-resonant mode according to the invention.

Switching voltage $V_{SW}$ applied at control input 112 is represented by topmost waveform 180 in FIG. 3, where the x-axis denotes time. A dashed line 182 indicates the start or beginning of on-time $t_{ON}$. A dashed vertical line 184 denotes the end of on-time $t_{ON}$.

In accordance with the invention, once initiated by the attainment of current level $i_{LSW} \leq i_{SET}$ in switching inductor 122, the length of on-time $t_{ON}$ is kept substantially equal to resonance period $T_{tank}$. This is done by taking advantage of switching capacitor current sensor 132 to trigger switching circuit 102 to turn off, thereby commencing an off-time $t_{OFF}$ period at the end of resonance period $T_{tank}$.

During resonance period $T_{tank}$, current sensor 132 registers switching capacitor current $i_{CSW}$, which is illustrated by waveform 186 in FIG. 3. In the present example, current $i_{CSW}$ oscillates between about 140 mA and −140 mA during resonance period $T_{tank}$.

In practice, current sensor 132 may convert the sensed current $i_{CSW}$ in capacitor 126 to a voltage by utilizing a simple current sense amplifier well known in the art. A current sense amplifier will typically measure the voltage across a low-valued current sense resistor placed in series with capacitor 126. Therefore, it should be understood that $i_{CSW}$ can be represented by a voltage $V_{CSW}$ rather than the actual switching capacitor current $i_{CSW}$. In this situation, comparator 146 is a simple voltage comparator. Note that the choice of measuring currents by corresponding voltages can also be made in current sensor 134 and comparator 136, as previously explained.

Capacitor voltage $V_{CSW}$ is represented by waveform 188 in FIG. 3. Note that in this example, voltage $V_{CSW}$ moves from a level slightly above zero, namely 0.8 V, to about 5.8 V and back to about 0.8 V as current $i_{CSW}$ performs one oscillation and returns to zero. The duration of this voltage oscillation corresponds to resonance period $T_{tank}$.

Comparator 144 keeps comparing the voltage at input 146 to ground 110 (zero voltage) that is applied at its inverting input 148. Once switching capacitor 126 has completed one full cycle, capacitor voltage $V_{CSW}$ returns to its lowest level, namely 0.8 V and switching capacitor current $i_{CSW}$ crosses zero. At this time, zero-crossing comparator 144 switches its output 150 from low to high. This change in polarity is communicated to regulation circuit 114 and switch 116 is turned off as previously described.

It should be noted that on-time $t_{ON}$ does not end up being exactly equal to resonance period $T_{tank}$, but only substantially equal to it as follows:

$$t_{ON} = T_{tank} + \Delta\tau. \quad \text{(Eq. 3)}$$

The reason for this is $\Delta\tau$, which represents a delay from switching capacitor current $i_{CSW}$ zero crossing to the switching of switch 116 from on to off. Delay $\Delta\tau$ is due to the non-instantaneous reaction of comparator 144, flip-flop 156 and other dead time. As an example, $\Delta\tau$ may be about 25 ns.

The duration of off-time $t_{OFF}$ corresponds to the time it takes for switching inductor current $i_{LSW}$ to once again drop below $i_{SET}$. At that point, the state of regulation of switching power supply 100 determined from current $i_{LSW}$ being less than $i_{SET}$ initiates a new cycle. As the cycle repeats, control signal 118 goes high again (see $V_{SW}$ represented by waveform 180). Off-time, $t_{OFF}$, is demarcated with hatching in both FIG. 1 and FIG. 3 for further clarification.

Switching inductor current $i_{LSW}$ is shown in FIG. 3 with waveform 190. The level of $i_{SET}$ is also indicated. Notice that $i_{LSW}$ oscillates between 495 mA and 345 mA in the present example, and that it changes discontinuously at times when control signal 118 represented by waveform 180 changes from 0 V to 3.8 V and back. Any discontinuous changes in output current $i_{OUT}$ or output voltage $V_{OUT}$ delivered to output 194 clearly represent undesirable noise referred to a switching harmonic noise.

According to the invention, the problem of switching harmonic noise at output 194 is resolved because it is output inductor 128 that is connected to output 194. At the beginning, during and at the end of off-time $t_{OFF}$, output inductor current $i_{LOUT}$, indicated by waveform 192 in FIG. 3, continues to decline very smoothly despite discontinuous changes of voltage $V_{SW}$ from 3.8 V to 0 V and switching inductor current $i_{LSW}$. Since $i_{LOUT}$ corresponds to output current $i_{OUT}$ of supply 100 the same is true at output 194. Thus, any load connected to output 194 experiences as smoothly changing output current $i_{OUT}$ that exhibits a low ripple.

It should be remarked, that during $t_{OFF}$ switching power supply 100 is not operating in a resonant mode. Instead, it is running in a quasi-resonant mode. In this mode, the characteristic response of output inductor 128 filters switching harmonic noise produced by the switching regulator.

Switching power supply 100 can be operated in a continuous conduction mode. In this mode, switch 116 is being constantly switched between $V_{BATT}$ and ground 110 in response to control signal 118, and the current in switching inductor 122 never idles at zero. Here, it is important to note that the length of off-time $t_{OFF}$ is determined intrinsically by loop 130 to maintain the desired output voltage $V_{OUT}$. In other words, the loop adjusts a duty cycle D according to:

$$D = \frac{V_{OUT}}{V_{BATT}}\left(1 + \frac{R_{loss}}{R_{load}}\right), \quad \text{(Eq. 4)}$$

in which $R_{loss}$ stands for loss resistance and $R_{load}$ stands for load resistance.

Using values $V_{OUT}=2V$, $V_{BATT}=3.4V$, $R_{loss}=0.26\Omega$ and $R_{load}=5.7\Omega$, duty cycle D is approximately 61.5%.

The overall switching period $T_{SW}$ of switch 116 is defined based on on-time $t_{ON}$ as:

$$T_{SW} = \frac{t_{ON}}{D}, \quad \text{(Eq. 5)}$$

since $$t_{ON} \approx T_{tank}.$$

From equation 1 we have calculated that $T_{tank}=527$ nsec, we can calculate that $T_{SW}=857$ nsec, giving a switching frequency $F_{SW}=1/T_{SW}=1.17$ MHz. Note that this switching frequency will change according to the input and output voltages $V_{BATT}$ and $V_{OUT}$.

Figure 4:
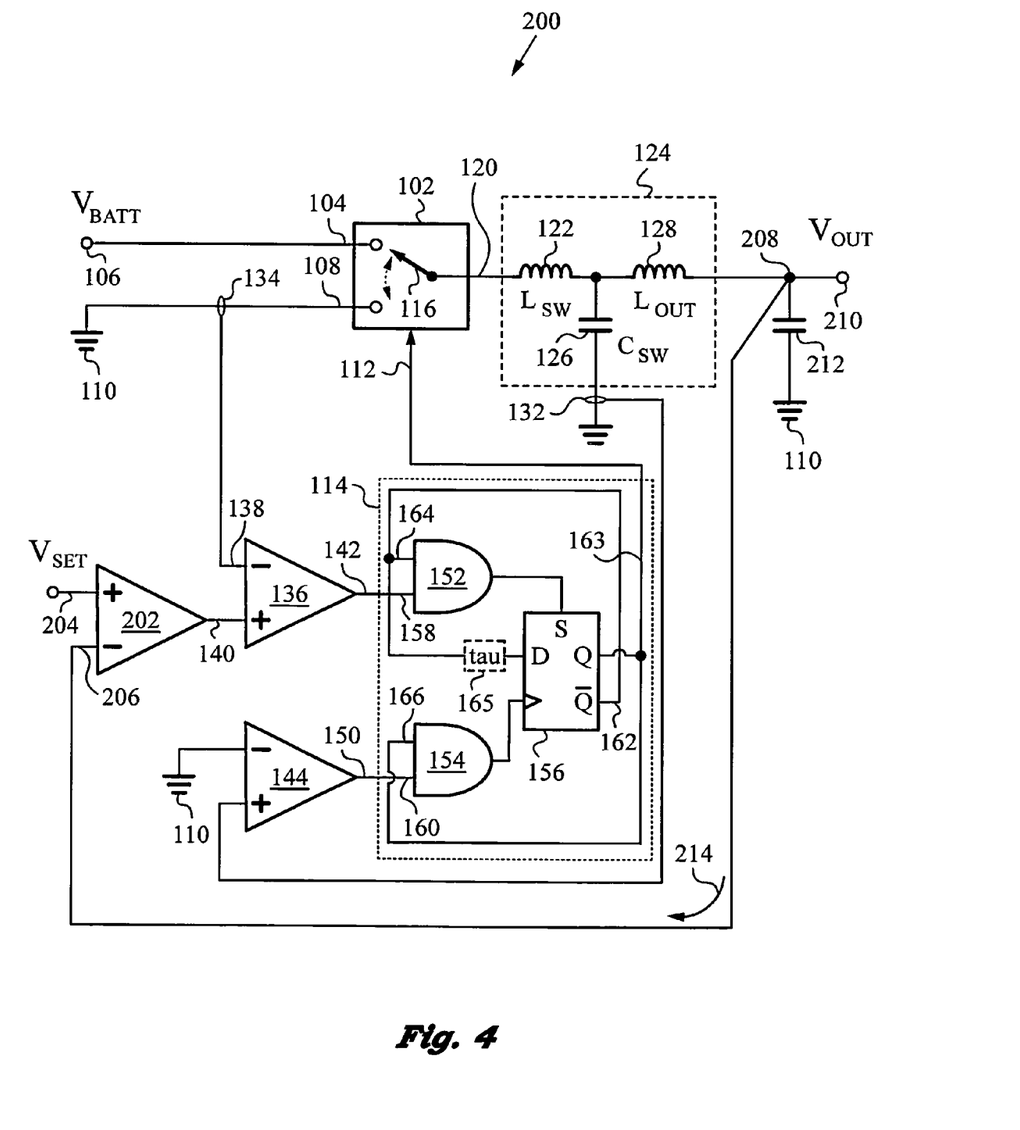
FIG. 4 is a diagram of a switching power supply according to the invention in which the state of regulation of the switching power supply is determined from an output voltage level.

FIG. 4 illustrates another switching power supply 200 according to the invention. Power supply 200 is very similar to power supply 100, but it is designed for ascertaining the state of regulation of switching power supply 200 in a different manner.

Power supply 200 deploys current sensor 134 to measure switching inductor current $i_{LSW}$ and supply the result to inverting input 138 of error comparator 136, as before. However, in this embodiment non-inverting input 140 of error comparator 136 is not connected to receive $i_{SET}$. Instead, it is connected to the output of a voltage error amplifier 202. A non-inverting input 204 of amplifier 202 is connected to a certain voltage $V_{SET}$, while an inverting input 206 of amplifier 202 is connected at a node 208 to an output 210 of power supply 200. An output capacitor 212 also called a reservoir capacitor is also connected at node 208. Typically, capacitor 212 has a comparatively large capacitance, and in the particular example described herein it is about 2.2 µF.

With these connections, power supply 200 uses an expanded switching circuit regulation loop 214 that includes all the elements of prior loop 130 as well as amplifier 202. The output of amplifier 202 corresponds to the error voltage between an output voltage $V_{OUT}$ at output 210 and the selected voltage $V_{SET}$. The error voltage at the output of amplifier 202 is applied to non-inverting input 140 of error comparator 136. The latter turns on when the error voltage increases above the voltage corresponding to $i_{LSW}$ as determined by sensor 134.

The regulation state of switching power supply 200 is thus determined from the level of output voltage $V_{OUT}$, and amplifier 202 serves as an output voltage sensor in switching circuit regulation loop 214. Note that since amplifier 202 is in regulation loop 214 it also strives to minimize the difference between $V_{OUT}$ and $V_{SET}$.

Figure 5:
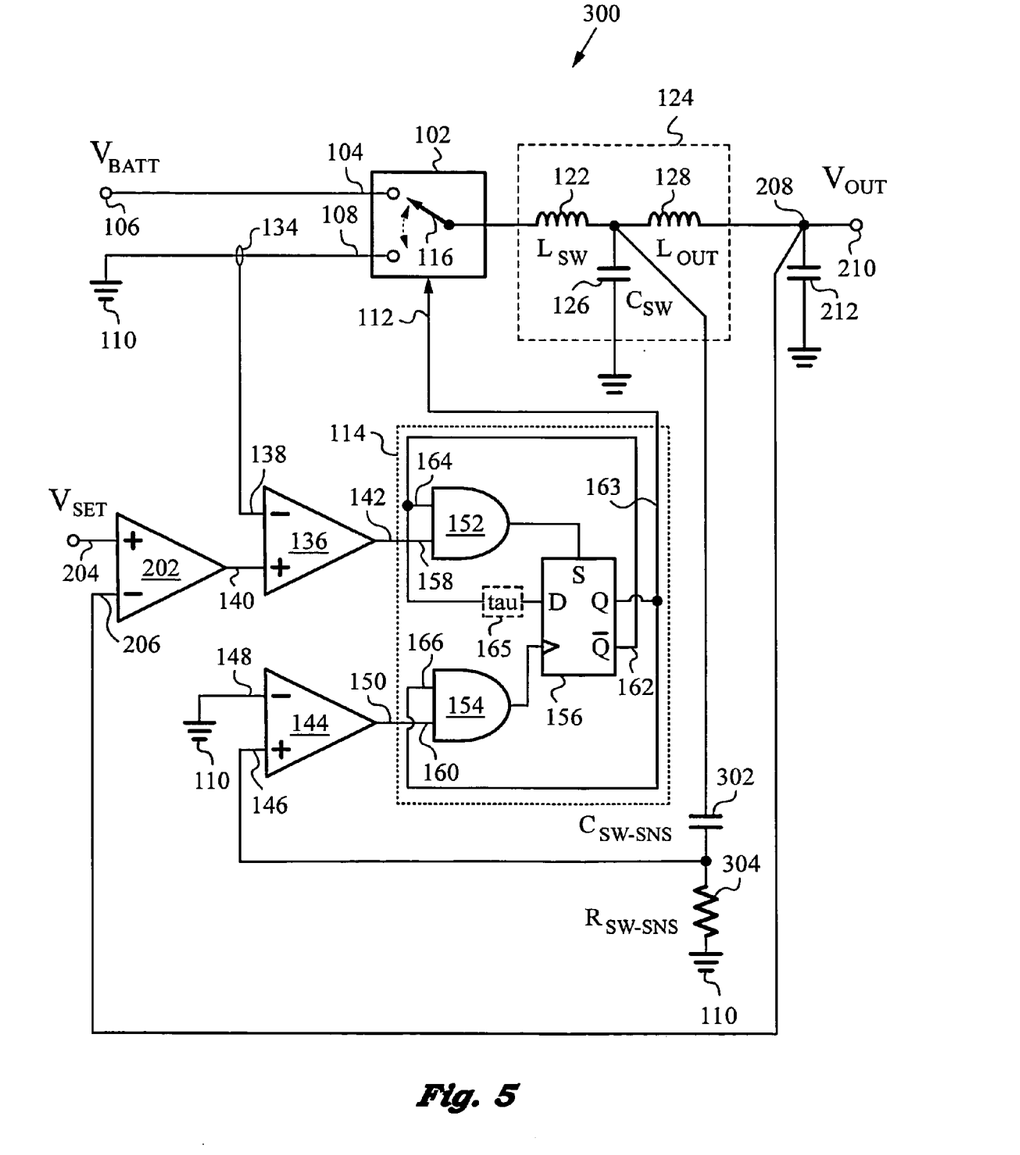
FIG. 5 is a diagram of another switching power supply according to the invention designed to measure switching capacitor current efficiently.

FIG. 5 illustrates a switching power supply 300 similar to power supply 200, but designed for more efficient measurement of switching capacitor current $i_{CSW}$. In this embodiment, a separate current sense capacitor 302 is connected in parallel with switching capacitor 126. Current sense capacitor 302 has a capacitance $C_{SW-SNS}$ that is significantly lower than the capacitance $C_{SW}$ of switching capacitor 126 of LCL tank 124. For example, $C_{SW-SNS}$ can be on the order of 0.4 nF to 40 pF, while $C_{SW}$ is 4.7 nF.

A current sense resistor 304 connects capacitor 302 to ground 110. The resistance $R_{SW-SNS}$ of resistor 304 is selected such that a voltage corresponding to $i_{CSW}$ can be measured between capacitor 302 and resistor 304 without drawing much power. As in the previous embodiment, the voltage representing $i_{CSW}$ is connected to non-inverting input 146 of zero-crossing comparator 144.

Since capacitors 126, 302 are connected in parallel, their capacitances add. The current passing through sense capacitor 302 is proportional to the ratio of capacitances $C_{SW-SNS}/C_{SW}$. Thus, $i_{CSW}$ can be measured with sense capacitor 302 without connecting to switching capacitor 126.

Due to its small capacitance $C_{SW-SNS}$, the current actually drawn by sense capacitor 302 is much lower than $i_{CSW}$. Thus, the overall V·I power losses associated with measuring $i_{CSW}$ are greatly reduced in switching power supply 300.

A person skilled in the art will recognize that the addition of sense capacitor 302, despite its small capacitance $C_{SW-SNS}$, will slightly modify the equations of LCL tank 124. In particular, resonance period $T_{tank}$ will be affected. This change needs to be taken into account using the above equations to ensure proper operation of switching power supply 300.

Figure 6:
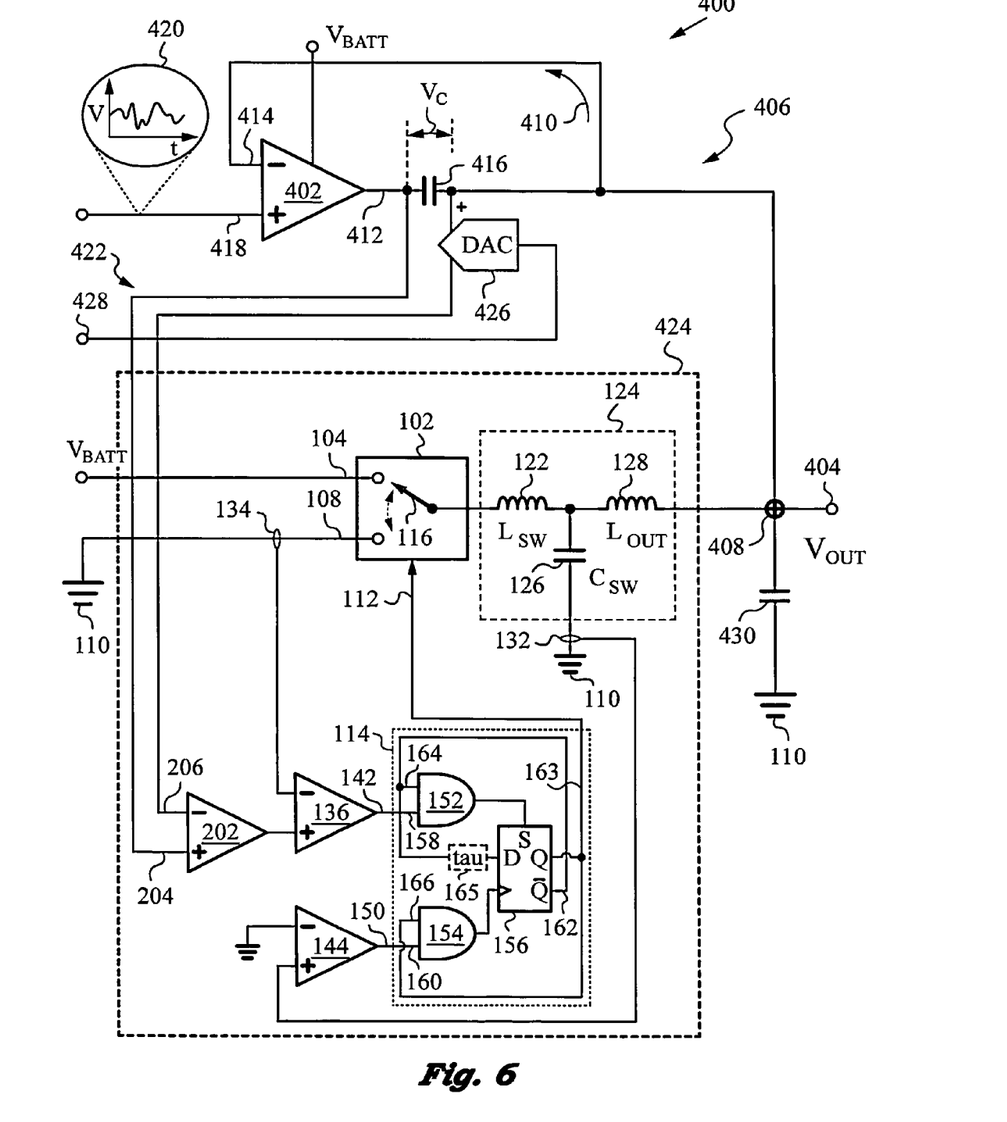
FIG. 6 is a diagram of a power supply using a switching power supply according to the invention with a linear driver and a combining network for adding the outputs of the switching power supply and the linear driver.

FIG. 6 is a diagram of a power supply 400 that has a switching power supply 424 in accordance with the invention and additionally deploys a linear driver 402 to handle high frequency components of the output, here represented by voltage $V_{OUT}$ at an output 404. The combination of linear drivers with switching regulators is generally desirable because with proper interconnection, a power supply using both can efficiently provide output components ranging from DC to high frequencies, e.g., up to 20 MHz. Several advantageous ways of interconnecting linear drivers with switching regulators and the corresponding combining networks are described in more detail in U.S. patent application entitled "Dynamic Power Supply Employing a Linear Driver and a Switching Regulator" and filed on the same date as the present application.

Power supply 400 has a combining network 406 for adding the outputs of switching power supply 424 and linear driver 402. Network 406 includes a summing or combining node 408 before output 404. Node 408 is preferably a simple wired connection. Its purpose is to sum an output of linear driver 402 with an output of switching power supply 400 and deliver them to output 404.

Combining network 406 includes a driver feedback loop 410. Loop 410 is a negative feedback loop around output 404 and between a driver output 412 of linear driver 402 and its inverting input 414. Loop 414 includes a capacitor 416 connected in series with driver output 412.

A non-inverting input 418 of driver 402 is designed to receive a control signal 420 that output $V_{OUT}$ of entire power supply 400 is trying to produce. Control signal 420 contains a number of frequency components, ranging from DC up to about 20 MHz.

Combining network 406 further includes a connection between driver 402 and switching power supply 424. Namely, non-inverting and inverting inputs 204, 206 of voltage error comparator 202 are connected to capacitor 416 at driver output 412 to receive capacitor voltage $V_C$ generated across it. Specifically, non-inverting input 204 and inverting input 206 are connected across capacitor 416 such that capacitor voltage $V_C$ is applied between inputs 204, 206.

Inputs 204, 206 correspond to an input 422 of switching power supply 424 of power supply 400. Switching power supply 424 is indicated in a dashed line and, as remarked above, and it is frequently referred to in the art as a switching regulator.

Input 422 of switching regulator 424 is thus controlled by capacitor voltage $V_C$, which determines regulator output current $i_{LOUT}$ at output of LCL tank 124, or, equivalently, at the output of switching regulator 424. That is because, given the interconnection between driver 402 and switching power supply 424, error comparator 202 will strive to minimize capacitor voltage $V_C$ by regulating output current $i_{OUT}$ of switching regulator 424. Note that the polarity of capacitor voltage $V_C$ will determine whether regulator output current $i_{OUT}$ is positive or negative.

Advantageously, power supply 400 has an offset voltage source 426, here in the form of a digital-to-analog converter (DAC), to provide a precise DC offset voltage at input 422 of switching regulator 424. DAC 426 is connected to a voltage source (e.g. a battery), via connection 428.

Because network 406 provides for the interconnection between driver output 412 and input 422 of switching regulator 424 in the manner described above, DAC 426 can provide the DC offset in order to set the DC level of the output of driver 402. More precisely, regulator 424 attempts, via its output, to boost the voltage at an output capacitor 430. It does so in order to servo the average voltage output of linear driver 402 to the DC offset voltage provided by DAC 426.

During operation of power supply 400, switching regulator 424 regulates its output to minimize the difference between the DC and low frequency components present at driver output 412 and the offset voltage from DAC 426 utilizing its regulator feedback loop established by network 406. In other words, switching regulator 424 attempts to counteract the offset voltage and capacitor voltage $V_C$ of capacitor 416 at its regulator output. To accomplish this, switching regulator 424 generates at its regulator output a regulator output current that forces the DC current component of capacitor 416 to be zero. The result is that switching regulator 424 contributes DC and low frequency current components to output 404.

Meanwhile, driver 402 generates the high frequency portions of control signal 420. In the process, because its feedback loop 410 closes around output 404, it also removes residual ripple in the output of switching regulator 424. Since, as seen above, the ripple is smooth and does not contain any high frequency switching noise, its removal by driver 402 is very effective. For more information about the process of removal or cancellation of the ripple from switching regulator 424 by driver 402, the reader is referred to the teachings contained in U.S. patent application entitled "Dynamic Power Supply Employing a Linear Driver and a Switching Regulator".

Figure 7:
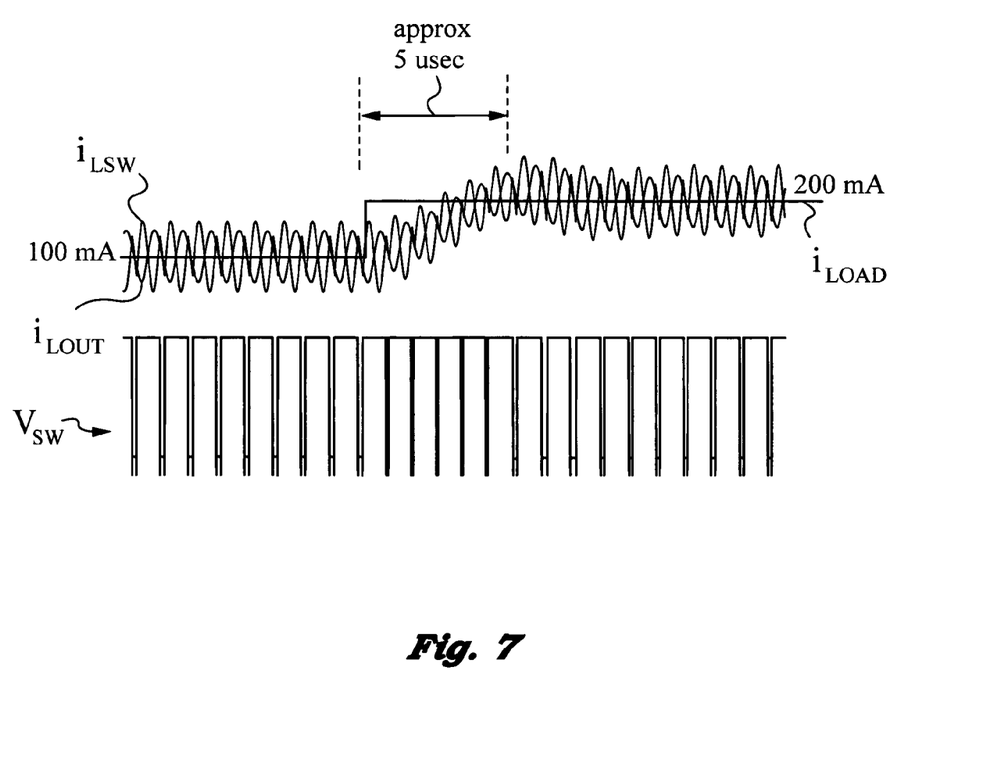
FIG. 7 illustrates a load step response of a switching power supply according to the invention.

FIG. 7 illustrates a load step response of a switching power supply according to the invention. Notice that switching inductor current $i_{LSW}$ as well as output inductor current $i_{LOUT}$ track the load step within 5 μsec. This is a very short time period and permits switching power supply according to the invention to be used even in very demanding, high-speed applications. Once again, note the lack of ringing in output inductor 128, which is a direct result of the quasi-resonant mode of operation.

In view of the above teaching, a person skilled in the art will recognize that the apparatus and method of invention can be embodied in many different ways in addition to those described without departing from the spirit of the invention. Therefore, the scope of the invention should be judged in view of the appended claims and their legal equivalents.

I claim:

1. A switching power supply operating in a quasi-resonant mode to filter switching harmonic noise, said switching power supply comprising:
   a) an LCL tank having a resonance period $T_{tank}$ defined by a switching inductor, a switching capacitor and an output inductor;
   b) a switching circuit comprising a control input, and a switching output connected in series with said switching inductor;
   c) a switching circuit regulation loop for turning on said switching circuit for an on-time $t_{ON}$, starting at a time determined by a state of regulation of said switching power supply;
   d) a switching capacitor current sensor for triggering said switching circuit to turn off for an off-time $t_{OFF}$ at an end of said resonance period $T_{tank}$;
   whereby said output inductor continues discharging during said off-time $t_{OFF}$ in said quasi-resonant mode.

2. The switching power supply of claim 1, wherein said switching capacitor current sensor triggers said switching circuit to turn off when said switching capacitor current reaches zero after said resonance period $T_{tank}$.

3. The switching power supply of claim 1, wherein said switching circuit comprises a pair of complementary switches for controlling said on-time $t_{ON}$ and said off-time $t_{OFF}$.

4. The switching power supply of claim 1, further comprising an inductor current sensor in said switching circuit regulation loop for monitoring a switching inductor current, said state of regulation of said switching power supply being determined by a predetermined level of said switching inductor current.

5. The switching power supply of claim 4, further comprising a comparator for comparing said switching inductor current with a set current $i_{SET}$ corresponding to said predetermined level.

6. The switching power supply of claim 1, further comprising an output voltage sensor in said switching circuit regulation loop for monitoring an output voltage of said switching power supply, said state of regulation of said switching power supply being determined by a predetermined level of said output voltage.

7. The switching power supply of claim 1, further comprising a linear driver connected with said switching power supply by a combining network.

8. The switching power supply of claim 7, wherein said combining network comprises a combining node for summing an output of said linear driver with an output of said switching power supply.

9. The switching power supply of claim 7, wherein said combining network comprises a driver feedback loop for said linear driver.

10. The switching power supply of claim 9, further comprising a capacitor is in series with an output of said driver.

11. The switching power supply of claim 1, wherein said switching capacitor current sensor comprises a secondary sense capacitor connected in parallel with said switching capacitor, said switching capacitor current being measured in said secondary sense capacitor.

12. A method for filtering switching harmonic noise in a switching power supply operating in a quasi-resonant mode, said method comprising:
   a) providing an LCL tank having a resonance period $T_{tank}$ defined by a switching inductor, a switching capacitor and an output inductor;
   b) providing a switching circuit having a control input and a switching output;
   c) connecting said switching output in series with said switching inductor;
   d) providing a switching circuit regulation loop for turning on said switching circuit for an on-time $t_{ON}$, starting at a time determined by a state of regulation of said switching power supply;
   e) determining an end of said resonance period $T_{tank}$ with a switching capacitor current sensor;
   f) turning off said switching circuit for an off-time $t_{OFF}$ at said end of said resonance period $T_{tank}$;
   whereby said output inductor continues discharging during said off-time $t_{OFF}$ in said quasi-resonant mode.

13. The method of claim 12, wherein said switching capacitor current sensor triggers said switching circuit to turn off when said switching capacitor current reaches zero after said resonance period $T_{tank}$.

14. The method of claim 12, wherein said on-time $t_{ON}$ and said off-time $t_{OFF}$ are controlled by a pair of complementary switched belonging to said switching circuit.

15. The method of claim 12, wherein said state of regulation of said switching power supply is determined by a predetermined level of a switching inductor current, said method further comprising:
   a) monitoring said switching inductor current with an inductor current sensor; and
   b) turning on said switching circuit when said switching inductor current drops below said predetermined level.

16. The method of claim 12, wherein said state of regulation of said switching power supply is determined by an output voltage of said switching power supply, said method further comprising placing an output voltage sensor in said switching circuit regulation loop for monitoring said output voltage.

17. The method of claim 12, further comprising connecting a linear driver with said switching power supply by a combining network.

18. The method claim 17, further comprising summing an output of said linear driver with an output of said switching power supply.

19. The method of claim 18, further comprising providing said linear driver with a driver feedback loop.

20. The method of claim 19, further comprising connecting a capacitor in series with an output of said driver.

* * * * *